United States Patent [19]

Danford

[11] 4,413,158
[45] Nov. 1, 1983

[54] AUTOMATIC CALL FORWARDING TELEPHONE APPARATUS

[76] Inventor: Glenn S. Danford, 329 NW. 21st St., Oklahoma City, Okla. 73103

[21] Appl. No.: 377,628

[22] Filed: May 13, 1982

[51] Int. Cl.³ .............................................. H04M 1/26
[52] U.S. Cl. ............................ 179/90 BD; 179/18 BE
[58] Field of Search ........... 179/90 BD, 81 R, 18 BE, 179/27 FH, 5 R, 5 P, 99 R, 160, 6.02, 18 B

[56] References Cited

U.S. PATENT DOCUMENTS

| 3,959,600 | 5/1976 | Sousa | 179/18 BE |
| 4,277,651 | 7/1981 | Fisher et al. | 179/90 BD X |
| 4,278,844 | 7/1981 | Jones | 179/18 BE X |

Primary Examiner—Stafford D. Schreyer
Attorney, Agent, or Firm—Robert M. Hessin

[57] ABSTRACT

Telephone apparatus for installation at a subscriber station to enable call forward operation as used in combination with the standard subscriber facilities. The unit includes ring detection and call forward programming circuitry. The call forward programming circuitry includes apparatus connected to the subscriber line and effective to dial a call forwarding access code and designated forwarding telephone number from a programmable storage. The ring detection circuitry provides for automatic actuation of the call forward program unit in the event of failure to actuate or energize manually.

13 Claims, 3 Drawing Figures

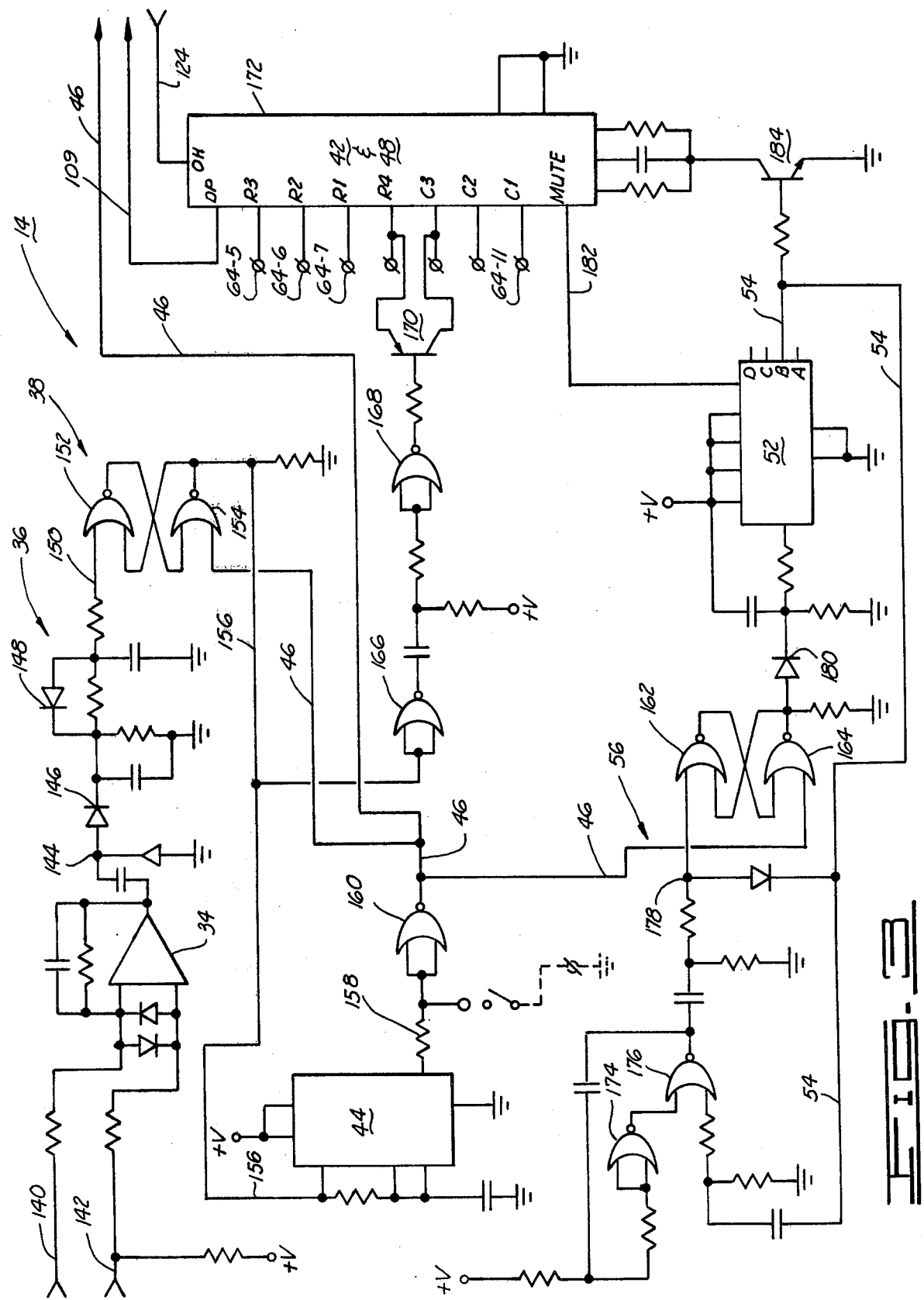

AUTOMATIC CALL FORWARDING TELEPHONE APPARATUS

BACKGROUND OF THE INVENTION

1. Field of the Invention

The invention relates generally to a call forwarding telephone device for use with standard and conventional subscriber lines and, more particularly, but not by way of limitation, it relates to an improved call forwarding actuation device for utilization with individual telephone installations under direct control of the subscriber.

2. Description of the Prior Art

The prior art includes various types of telephone circuitry for use in call forward operations wherein direct inward dialing (DID) services are utilized for reception and control of telephone numbers that have been pre-selected for call diverting from their normal answering stations to some central answering service station. These types of services are widespread and well-known and, as controlled by the service, the subscriber station to be answered must be placed into answering service control by overt action or the surveillance of that subscriber number will not be carried out. In the prior types of service, there are various forms of electronic switching circuitry at system central; however, all such prior systems utilize the DID interconnect or other central storage and interconnect circuitry in order to carry out their function of monitoring activity on a plurality of subscriber stations.

SUMMARY OF THE INVENTION

The present invention relates to improvements in circuitry for effecting telephone call forwarding from an unattended station. More particularly, the call forwarding circuit is actuatable by the subscriber at the station to be monitored; and, in the event of failure to actuate, the call forward circuit is automatically actuated to program call forwarding into the central office and thus relay calls to a pre-selected telephone number upon acceptance of the first incoming phone call during unattendance. Operating power is derived from the subscriber line. Ring detection circuitry actuates a six second counter reset means which, in turn, enables a ring counter to provide a SET output to forwarding circuitry. The forwarding circuitry consists of an answer circuit latch which receives SET input after an appropriate number of rings are counted as well as dialing input from a programmed telephone number memory and dialer circuit, the dialing input being that telephone number selected by the subscriber to receive the relayed calls. When enabled, dial or tone output is then provided from the answer circuit latch onto the subscriber line of the electronic switching system. In the event that the forwarding circuit had not been manually enabled to relay the incoming calls, the first incoming call that is detected is amplified and applied through detection and latching circuitry thereby to automatically actuate the dialer circuit after a predetermined delay.

Therefore, it is an object of the present invention to provide a call forwarding device which can be connected with a single telephone installation and controlled by the operator to relay all calls to a designated receiving number.

It is also an object of the invention to provide a call forwarding device which is under the control of the operator in attendance at the subscriber station or telephone number to be monitored.

It is an object of the invention to provide call forwarding circuitry that is telephone line powered.

It is still another object of the present invention to provide a call forward monitoring system which is fail-safe in that failure of the station operator to actuate the programming circuitry will still find the initial incoming call actuating the call forward system to a pre-designated number.

It is also an object of the present invention to provide a call forward circuit which will fail to receive only one call at the most should the operator fail to properly actuate the subscriber station unit for relay dialing.

Finally, it is an object of the present invention to provide a reliable, low cost call forward programming circuit that can be easily installed and programmed for relay monitoring of incoming telephone calls to a pre-designated receiver station.

Other objects and advantages of the invention will be evident from the following description when read in conjunction with the accompanying drawings which illustrate the invention.

BRIEF DESCRIPTION OF THE DRAWINGS

FIG. 3 is a schematic drawing of the forward programming circuitry of the present invention.

DETAILED DESCRIPTION OF THE INVENTION

Figure 1:
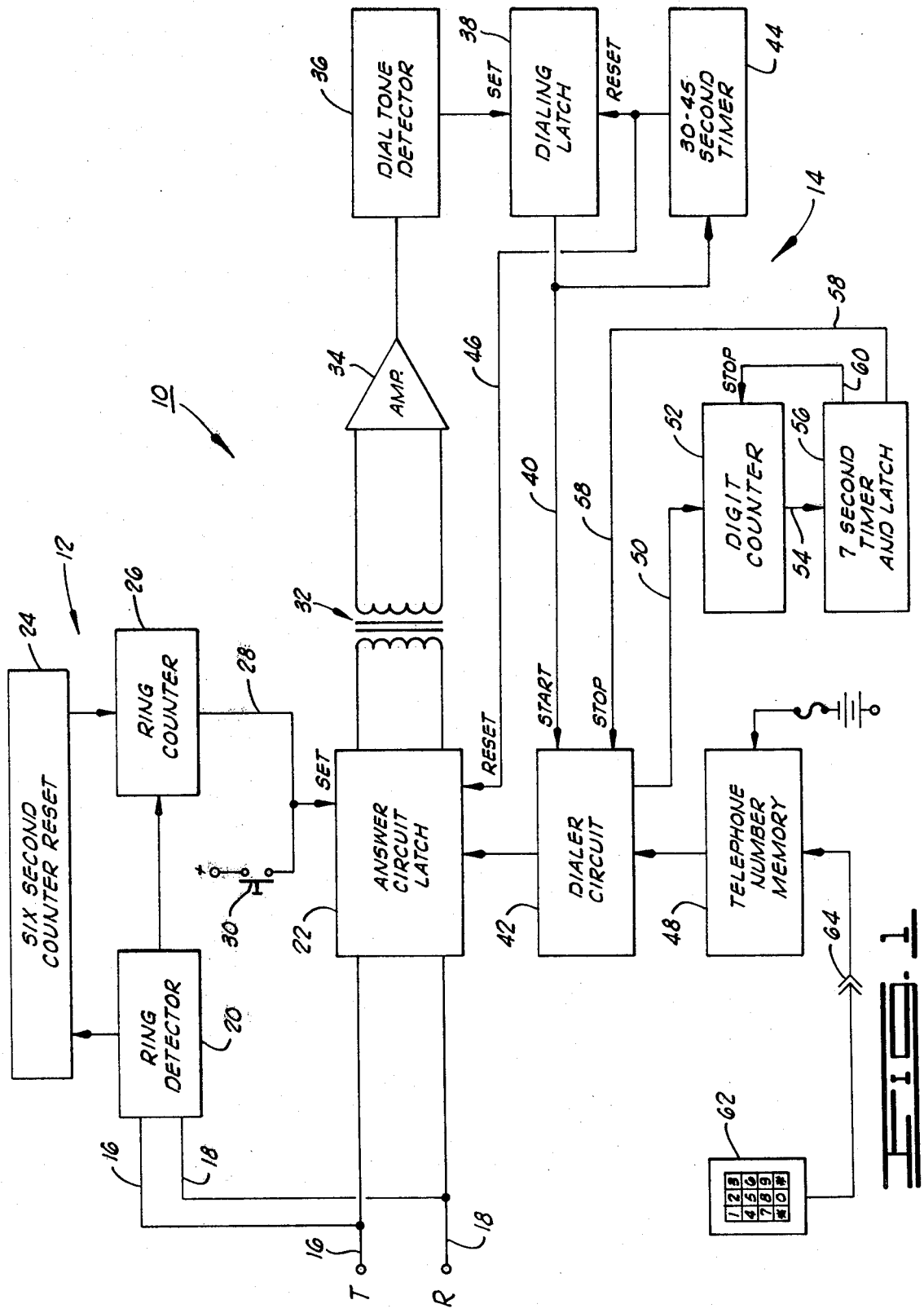
FIG. 1 is a block diagram of the call forwarding circuit of the present invention.

FIG. 1 illustrates the call forwarding circuit 10 as it consists of ring detection circuitry 12 functioning in co-action with forward programming circuitry 14. Connection of call forwarding device 10 is made directly to the subscriber line through such as a T-adaptor of well-known type, and then it is merely required that the user inform the telephone company that he is on line and requires call forwarding to complete his service. Billing of the subscriber is adjusted accordingly. The TIP and RING subscriber lines are input at leads 16 and 18, respectively, for parallel input to each of a ring detector 20 and an answer circuit latch 22. Output from ring detector 20 is applied to a six second counter reset 24 which, in turn, provides an output to a ring counter 26, i.e., a telephone ring counter. Output from ring detector 20 is also applied to ring counter 26 and output enabling signal on lead 28 appears as SET input to the answer circuit latch 22. Closure of an actuate switch 30 energizes the call forwarding circuit 10 and sets the relay monitoring function in operation, as will be further described below.

Output from answer circuit latch stage 22 is applied through a transformer 32 for input to an operational amplifier 34, the output of which is applied to a dial tone detector 36. A dial tone detection output is then applied as a SET input to a dialing latch circuit 38 which generates a START signal output on line 40 to initiate function of the dialer circuit 42. Dialing latch output on line 40 is also applied to a delay timer 44 which, after a designated delay time, provides output on a line 46 that is applied as RESET input to both the dialing latch 38 and the answer circuit latch 22 at termination of circuit operation. The RESET output from delay timer 44 has the effect of "hanging up" the telephone circuit.

Actuation of the dialer circuit 42 by START input on the line 40 commences read-out of pre-programmed access code and telephone number data from a telephone number memory 48. An output 50 from dialer circuit 42 is applied to actuate a digit counter 52 which counts two digits and provides a START output on lead 54 to a seven second timer and latch 56. The timer and latch 56 then provides a STOP output on lead 58 for input to dialer circuit 42 to stop dialing for the duration of the timer, and a latch output on line 60 is applied to stop the digit counter 52.

The telephone number memory 48 is readily programmed by the use of a standard form of digital keyboard 62. An accessible receptacle is provided on the chassis of call forward circuit 10 for receiving a plug connection 64 from the programming keyboard 62 as energized by a suitable power source 66, to be described. The dialing of a number sequence of seven to eleven digits may be input to the telephone number memory 48 by dialing the sequence of the forward access code number (normally 7-2), waiting a seven second delay, and then dialing in the telephone number to receive call forwarding. The access code and telephone number are then in memory 48 and available for input to dialer circuit 42 and actuation of answer circuit 22.

Figure 2:
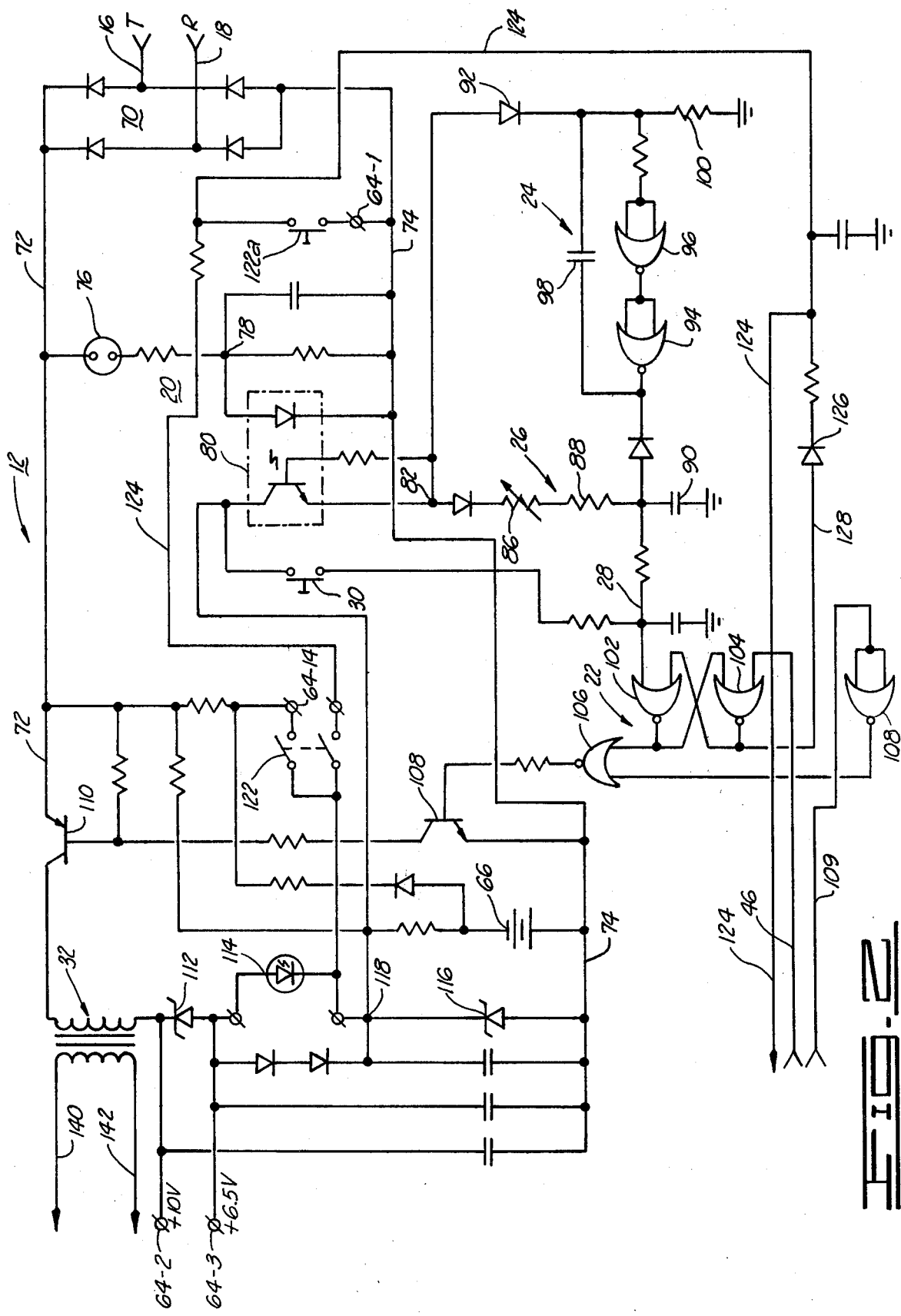
FIG. 2 is a schematic drawing of the ring detection circuitry of the present invention.

Referring now to FIG. 2, the ring detection circuitry 12 is connected to the TIP and RING lines 16 and 18 of the subscriber line via a rectifier bridge 70 to a lead 72 and a common lead 74. A neon discharge lamp 76 is connected with suitable resistance between leads 72 and 74, the discharge lamp 76 serving to pass alternating current and thereby eliminate loading of the phone line except during the ringing condition. A voltage dividing junction 78 provides input to the light emitting diode of an opto-coupler 80 which generates an output from the NPN detector as seen at emitter junction 82. Thus, during a ring, indicating voltage is developed at junctions 78 and 82 as input to the ring counter 26 consisting of a potentiometer 86 in series with resistor 88 and capacitor 90 to ground. Adjustment of the potentiometer 86 serves to adjust the capacitor 90 to charge fully in a selected number of rings, and the six second counter reset 24 discharges capacitor 90 after the six second count in readiness for a next operation.

Thus, voltage present at junction 82 through diode 92 energizes series-connected NOR gates 94 and 96 after a selected R-C time determined by capacitor 98 and resistor 100 to ground. SET output from ring counter 26 via lead 28 is then applied to the answer circuit latch 22 consisting of NOR gates 102 and 104 connected in latch configuration. RESET input on lead 46 from the delay timer 44 (FIG. 3) is applied to NOR gate 104. A NOR gate 106 receives input from NOR gate 102 along with parallel input from a NOR gate 108 as actuated by pulse output on a lead 109 from the dialer circuit 42 (FIG. 3). Output from the NOR gate 106 is then applied to the base of an NPN transistor 108 connected common emitter with the collector connected to a PNP transistor 110 in the ring supply lead 72. Collector output from transistor 110 is then present across the primary of transformer 32 and through a Zener diode 112, indicator LED 114 and zener diode 116 to a common lead 74.

Circuit power as capacity filtered is generated from line power (16, 18) as developed across zener diodes 112 and 116 as five volts DC is maintained at junction 118. Additional voltage outputs at receptacle junctions 64-2 and 64-3 provide further power as well as programming power to keyboard 62 (FIG. 1). The junctions 64-n designated as a circle-slash, seven of which are indicated on FIG. 2, are junctions which are also receptacle pin connections of plug/receptacle 64 (FIG. 1), that is utilized during programming operation. As will be seen, the seven more additional of such junction receptacle connections 64-5 to 64-11, as shown in FIG. 3, provide row and column selection inputs to the telephone number memory 48.

A gang switch 122 is also actuated during programming operation to increase the power supply available for programming of the telephone number memory 48. Thus, closure of gang switch 122 enables an increased voltage on line 124 which is applied to the OFF HOOK input of the dialer/memory chip, as will be described. Parallel output via a diode 126 and lead 128 is applied to the output of NOR gate 104 and input of NOR gate 102 to reverse the latch circuit 22.

FIG. 3 illustrates the forward programming circuitry 14 in greater detail. Dial tone output from transformer 32 (FIG. 2) is applied on lines 140 and 142 as input to the amplifier 34. The amplifier 34 is connected as a conventional operational amplifier, an integrated circuit Type 1458, which functions to provide amplified dial tone voltage at a junction 144 for input to dial tone detector 36. The detector 36 is a simple diode detector utilizing diodes 146 and 148 to provide an output on lead 150 to the dialing latch circuit 38. Latch circuit 38 consists of latch configuration NOR gates 152 and 154 which provide output via lead 156 for input to the digital timer 44 at pin number 7. The digital timer 44 is an integrated circuit Type 555, and output is provided from pin number 3 via resistor 158 for input to an inverter connected NOR gate 160. Output from NOR gate 160 is then applied via leads 46 to (1) the input of NOR gate 154 of dialing latch 38, (2) to an input of NOR gate 104 of answer latch circuit 22 (FIG. 2), and (3) to an input of the latch portion of timer and latch circuit 56, i.e. NOR gates 162 and 164.

Output on lead 156 from the dialing latch circuit 38 is also applied through NOR gates 166 and 168 to the base of a PNP transistor 170 having emitter and collector connected between the R4 and C3 inputs to an integrated circuit 172, a type 5393 Memory and Dialing Circuit IC 172 carries out functions of both the dialer circuit 42 and the telephone number memory 48. It may be noted that a plurality of receptacle junctions 64-5 to 64-11 as connected to the R1-4 and C1-3 row and column inputs to memory and dial circuit 172 are also connected through the receptacle 64 (FIG. 1) for connection to the external programmer 62.

NOR gates 174 and 176 function as a seven second timer when enabled by input on lead 54 from digit counter 52 after a two digit count. After the seven second count, counter output at junction 178 is applied to enable the latch circuit, i.e. NOR gates 162 and 164 with latched output being applied through a diode 180 as input to digit counter 52, a Type 4520 Digital Counter. Input through diode 180 serves to turn off the digit counter 52 and to release the turn-off during designated count periods. Output connection is also made from dialer and memory circuit 172 via lead 182 to provide digit input to digit counter 52, and output on the lead 54 is applied to the base of an NPN transistor 184 which is connected common-emitter to turn off dialer circuit 172 after two digits for a further pause of seven seconds.

In operation, the call foward circuit 10 will be installed with a selected telephone by T-connection with a telephone plug adaptor of commercially available type, e.g. the RJ11C jacks of the type available from the local telephone company. The call forward circuit 10 is subscriber line powered but it also includes the stand-by battery 66 (FIG. 2) which provides back-up power as well as a source of increased power for use in the programming operation. Programming is effected from a separate unit 62 which is connectable by attachment through plug and socket receptacle 64. The call forward circuit 10 can be programed when connected to the subscriber line or before such connection. Thus, the programmer 62 can be coupled via connector 64 whereupon program switch 122 is actuated closed to provide additional battery voltage on line 124 to the dialer memory 172 and the answer latch circuit 22. The programmer 62 is then actuated by pressing the call forwarding access code number for the particular electronic switching system, this is normally "7-2". Thereafter, the programmer 62 is actuated to enter the phone number where you desire the calls to be forwarded to, this may be a 7 to 11 digit number. If you are an answering service, you merely enter the customer's direct inward dialing (DID) number. The programmer 62 may then be disconnected at connector 64 until such time as the programmer 62 may be further utilized to program one or more call forward units.

The call forward circuit 10, when connected into the subscriber line, is in operation at all times and the number placed in dialer/memory 172 may be that of an answering service, a telephone subscriber's alternate phone, or any other selected position for monitoring incoming calls. When the telephone subscriber leaves the premises having the call forward circuit 10, he need only depress the push-button switch 30 to activate the call forward unit. Thereafter, every call to the subscriber number is re-routed at central of the electronic switching system with calls going to the number that has been pre-programmed into dialer memory 172. Upon returning to the subscriber premises, the subscriber is merely required to pick up the telephone and dial the pre-stipulated cancellation number, usually "7-3" (7-3-# for Touch Tone telephones). If, at that time, the subscriber hears a stutter tone followed by dial tone, it is an indication that he has had one or more calls forwarded and that he should check with his answering service. If the subscriber hears only the busy tone, then call forwarding was never programmed, i.e. placed in operation.

The above operation is the manual or normal operation wherein the activation switch 30 is depressed prior to leaving the subscriber station. That is, depression of push-button 30 energizes a red LED 114 and, after approximately 7-8 seconds, the unit will flash the first two digits programmed into memory, i.e. the call forward access code of 7-2. The unit then waits for a period of seven seconds until it receives the ESS call forwarding dial tone and, thereafter, LED light 114 flashes the number to which you are forwarding the calls. Approximately thirty seconds after you had initially pressed the program button, the unit will turn off and your call forwarding will be programmed through the electronic switching system. If the dialed number was busy or unanswered, then the first call after you leave the subscriber premises will automatically program your line, as described below.

The call forward unit 10 is equipped with a special automatic actuation wherein it is placed in operation by selected ringing input in the event that the subscriber failed to push the activation push-button 30 prior to leaving the premises. The call foward unit 10 includes a ring detector 20 and ring counter 26 which provide sufficient delay for regular use of the telephone but which, when a selected ring count is exceeded, automatically place the call forward unit 10 in the answering mode. The potentiometer 86 (FIG. 2) may be adjusted to control ring counter 126 for a selected ring delay, e.g. between 3 and 10 rings, with 4 to 6 rings being a normal setting. When the phone has rung a selected number of times, the call forward unit 10 will answer the call with a silent phone such that the caller will hang up. Thereafter, the ESS office returns dial tone, whereupon the unit takes an additional five seconds to verify that it is dial tone, and then the dialing latch 38 energizes dialer/memory 172 to dial the call forwarding access code (7-2). After seven seconds delay, a second dial tone is detected to restart dialer/memory 172 to output the phone number designated.

The foregoing discloses a novel circuit device for telephone call forward operation from a subscriber premises. A unit constructed in accordance with the present invention provides a fail-safe aspect in that even when the subscriber-user fails to activate the call forward unit upon vacating the subscriber premises, a first incoming call will automatically activate the call forward unit and provide input of the forwarding number to the answering phone, i.e. to an answering service or other designated receiver. Once connected, the call forward device is always in operation since it is powered totally from the subscriber line.

Changes may be made in combination and arrangements of elements as heretofore set forth in the specification and shown in the drawings; it being understood that changes may be made in the embodiments disclosed without departing from the spirit and scope of the invention as defined in the following claims.

What is claimed is:

1. Telephone apparatus for connection to a subscriber line for a subscriber station, comprising:
   means programmable to contain an electronic switching system call forwarding access code and designated station telephone number and energizable to dial out on said subscriber line to effect call forwarding of subsequent calls to said designated station;
   switch means actuatable to energize said means programmable to effect call forwarding of said subsequent calls; and
   circuit means responsive to detection of an incoming call unanswered for a pre-set duration for alteranative operation to energize said means programmable to effect call forwarding of said subsequent calls when said switch means is unactuated.

2. Telephone apparatus as set forth in claim 1 wherein said means programmable comprises:
   means energizable for detecting incoming dial tone and providing a start output; and
   programmable storage and dialer means responsive to said start output to commence dial output of said access code and telephone number onto the subscriber line.

3. Telephone apparatus as set forth in claim 2 wherein said circuit means comprises:

detector means receiving input of an incoming call and generating said energizing output after a selected count of rings.

4. Telephone apparatus as set forth in claim 1 wherein said circuit means comprises:
detector means receiving input of an incoming call and generating said energizing output after a selected count of rings.

5. Telephone apparatus as set forth in claim 1 wherein said means programmable comprises:
answer means connected to said subscriber line and energizable with set input from said switch means to provide a dial tone output;
dialer means containing said access code and telephone number in memory for output to said answer means and outgoing subscriber line in response to a start signal input; and
dial tone detector means responsive to dial tone output from the answer means to generate a start signal for input to said dialer means.

6. Telephone apparatus as set forth in claim 5 which is further characterized to include:
digit counter means connected to sense digit output from said dialer means to provide a two count output; and
timer means responsive to said two count output to generate a latch output to said dialer means thereby to cease dialer means readout output for a selected duration between dial out of the access code and the telephone number.

7. Telephone apparatus as set forth in claim 6 which is further characterized to include:
second timer means responsive to said start signal output from said dial tone detector means to generate a reset output after a selected duration for input to reset said answer means and dial tone detector means after cessation of all dial output onto the subscriber line.

8. Telephone apparatus as set forth in claim 1 which is further characterized to include:
power supply means energized by said subscriber line to provide voltage output to supply said means programmable and means operable.

9. Telephone call forwarding apparatus for use with a subscriber station comprising:
circuit means connected to the subscriber station line and programmable to contain stored electronics switching system call forwarding access code number and telephone number for a designated station, said circuit means being actuatable to dial said stored access code and telephone number onto the subscriber line to effect call forwarding to the designated station as subsequent calls are completed by said electronic switching system;
means for detecting a preset number of incoming rings on the subscriber line to provide a set output to actuate said circuit means; and
means to return service to said subscriber station line.

10. Telephone apparatus as set forth in claim 9 which is further characterized to include:
power supply means energized by said subscriber line to provide voltage output to supply said circuit means and means for actuating.

11. Telephone apparatus as set forth in claim 9 wherein said circuit means comprises:
answer circuit latch means connected to the subscriber line and enabled by said means for actuating, said answer means providing dial tone output of an incoming call;
detector means receiving said dial tone output and generating a start output;
dialer and memory means retaining an access code and designated call forwarding telephone number in storage and being energizable to output a code and number signal in response to input of said start output from the detector means; and
means routing said output code and number signal to said answer circuit latch means for output onto said subscriber line.

12. Telephone apparatus for connection to the line of a subscriber station, comprising:
dialer means programmable to contain an electronic switching system call forwarding access code and a designated station telephone number and actuatable to dial out said access code and telephone number on said subscriber line to effect forwarding of incoming calls to said designated station from the electronic switching system;
switch means manually operable to actuate said dialer means;
circuit means alternatively operable to actuate said dialer means after detection of incoming call unanswered for a predetermined duration; and,
programmer means removably attachable to said apparatus in electrical connection to said dialer means to program in said access code and telephone number.

13. Telephone apparatus as set forth in claim 12 which is further characterized to include:
power supply means energized by said subscriber line to provide voltage output to supply said dialer means, switch means and circuit means.

* * * * *